US009149007B2

(12) United States Patent
Danowski et al.

(10) Patent No.: US 9,149,007 B2
(45) Date of Patent: Oct. 6, 2015

(54) BLOW MOLDED NURSERY CONTAINER WITH STIFFENED RIM AND FLEXIBLE HANDLES

(71) Applicant: Nursery Supplies, Inc., Chambersburg, PA (US)

(72) Inventors: Joseph P. Danowski, Greencastle, PA (US); Timothy W. Horton, Marion, PA (US); Robert L. Cook, Chambersburg, PA (US); Mark R. Alt, Carlisle, PA (US)

(73) Assignee: Nursery Supplies, Inc., Chambersburg, PA (US)

( * ) Notice: Subject to any disclaimer, the term of this patent is extended or adjusted under 35 U.S.C. 154(b) by 276 days.

(21) Appl. No.: 13/793,531

(22) Filed: Mar. 11, 2013

(65) Prior Publication Data
US 2014/0182201 A1     Jul. 3, 2014

Related U.S. Application Data

(60) Provisional application No. 61/748,351, filed on Jan. 2, 2013.

(51) Int. Cl.
*A01G 9/02* (2006.01)

(52) U.S. Cl.
CPC ........... *A01G 9/021* (2013.01); *Y10T 29/49826* (2015.01)

(58) Field of Classification Search
CPC ......... A01G 9/02; A01G 9/021; A01G 9/102; A01G 9/108
USPC ........ 47/39, 41.11, 65.5, 65.7, 66.6, 66.7, 73, 47/75, 76, 87; 220/640, 641, 642, 643, 220/646, 647, 649, 651, 652, 653, 654, 669, 220/675, 676, 768, 770, 774, 775, 776, 5, 220/754
See application file for complete search history.

(56) References Cited

U.S. PATENT DOCUMENTS

| 1,371,175 | A |   | 3/1921 | Langer |         |
|-----------|---|---|--------|--------|---------|
| 2,115,649 | A |   | 4/1938 | Stahl  |         |
| 3,491,913 | A | * | 1/1970 | Giraudet et al. | 220/801 |
| 4,068,779 | A | * | 1/1978 | Canfield | 220/754 |
| 4,386,715 | A | * | 6/1983 | Morton | 220/798 |

(Continued)

OTHER PUBLICATIONS

Canadian Office Action for Application No. 2,814,476, dated Jan. 28, 2015, 4 pages.

*Primary Examiner* — Rob Swiatek
*Assistant Examiner* — Ebony Evans
(74) *Attorney, Agent, or Firm* — Drinker Biddle & Reath LLP (57) ABSTRACT

A blow molded nursery container is disclosed that includes a substantially circular side wall, a closed bottom end, an open top end, and a projecting lip positioned on the outer circumference of the open top end with a radial flange and recessed portion with a substantially hollow cross-section. At least two handles are connected to the container. Each handle includes a flexible member with a portion that is located above and spaced apart from the lip. The spacing of the flexible member permits access by a user's fingers. The flexible member extends through at least two holes in the side wall or flange and is restrained on the opposite side of the side wall or flange from the portion above the lip so as to connect the handle to the container. The two flexible members are preferably secured to one another.

17 Claims, 6 Drawing Sheets

(56) References Cited

U.S. PATENT DOCUMENTS

| | | | |
|---|---|---|---|
| 4,632,115 A * | 12/1986 | Bernardini | 607/86 |
| 4,972,963 A | 11/1990 | Guarriello et al. | |
| 5,051,084 A | 9/1991 | Guarriello et al. | |
| 5,209,891 A | 5/1993 | Guarriello et al. | |
| 5,364,675 A | 11/1994 | Guarriello et al. | |
| 5,503,886 A | 4/1996 | Guarriello et al. | |
| 6,758,365 B2 | 7/2004 | Jackson | |

* cited by examiner

BLOW MOLDED NURSERY CONTAINER WITH STIFFENED RIM AND FLEXIBLE HANDLES

RELATED APPLICATION

This application is related to and claims priority from U.S. Provisional Application No. 61/748,351, filed on Jan. 2, 2013, the disclosure of which is incorporated herein by reference in its entirety.

FIELD OF THE INVENTION

The present invention relates to nursery containers and, more particular, a blow molded nursery container with flexible handles.

BACKGROUND

Large size, blow molded nursery container containers are in extensive use by nurseries for growing trees and large plants. The size of the container permits the tree and plant to grow to an acceptable size for sale. In many cases a tree can grow in the same container for several years. Once the tree reaches maturity, it is sold, in many cases, in the same container. Due to the large size of the tree transporting the container can be difficult.

U.S. Pat. No. 5,503,886, which is assigned to the assignee of the present invention, discloses a stiffener or recessed lip that stiffens the upper rim of the blow molded container. The term "recessed lip" or "reversed lip" as used herein refers to a generally U-shaped hollow member which is formed at the upper open edge of an article. The lip increases the rigidity of the container, and also provides a handle for lifting the container.

The above patent discloses a unique blow molding process for forming a recessed lip on a container through the use of movable mold components that fold a portion of the parison upon itself while maintaining the hollow integrity of the rim.

While the rim has provided a convenient mechanism for lifting containers, a need has developed for adding a better handle system to containers to facilitate their transport.

SUMMARY OF THE INVENTION

A blow molded nursery container is disclosed that includes a substantially circular side wall, a closed bottom end, an open top end, and a projecting lip positioned on the outer circumference of the open top end. The lip includes a radial flange portion extending outwardly from the periphery of the open top end. A recessed portion is attached to the flange and has a substantially hollow cross-section formed during blow-molding of the container. The recessed portion includes an inner wall, an outer wall that is spaced apart from the inner wall, and a lower wall attached to the inner and outer walls so as to define a hollow area between the inner and outer walls. An upper wall is attached to an upper end of the outer wall and extends over the hollow area and at least a portion of the flange. The recessed portion is radially separated from the side wall by the flange so as to form a channel therebetween.

In one embodiment, at least two handles are connected to the container. Each handle includes a flexible member with a portion that is located above and spaced apart from the lip. The spacing of the flexible member permits access by a user's fingers. The flexible member extends through at least two holes in the side wall or flange and is restrained on the opposite side of the side wall or flange from the portion above the lip so as to connect the handle to the container.

In one configuration, the flexible members of the handles are connected to one another such that the flexible members form a loop around the circumference of the container. The connection of the flexible members to one another provide the connection of the handles to the container. The flexible members are preferably integrally connected to one another on one side of the container and clamped to one another on the other side of the container.

In another configuration, the flexible members have stops attached to their ends. The stops are formed larger than the holes so as to prevent the flexible member from feeding backwards and out of the hole.

Preferably the holes are formed in the flange of the lip between the side wall and the recessed portion, and a portion of each flexible member extends in the channel between the holes. In one embodiment there are eight holes formed in the flange, and the loop of flexible members extends through the holes in a serpentine manner such that between the handles, portions of the flexible members are in the channel and at least a portion is located above the flange.

It is contemplated that the flexible member is a rope or strap that is preferably made from nylon, Kevlar, rubber or braided twine.

In another embodiment of the invention, a blow molded nursery container as described above includes a flexible member that extends around the container and has two ends. The flexible member forms at least two handles. In this embodiment, the flange of the lip includes at least four holes, and portions of the flexible member extend upward through one hole and downward through an adjacent hole such that portions of the flexible member are located above the flange and portions are located below the flange. The portions above the flange form the handles, and the portions below the flange extend within the channel. The ends of the flexible member are secured to one another to form a loop around the container.

In a further embodiment, a blow molded nursery container is disclosed as described above and includes a first flexible member engaged with the container that has a portion extending above the lip. The first flexible member passes through first and second holes formed in the side wall or flange of the lip. A second flexible member is engaged with the container on an opposite side of the container from the first flexible member. The second flexible member includes a portion extending above the lip. The second flexible member passes through third and fourth holes formed in the side wall or flange of the lip.

A method is also disclosed for forming a blow molded nursery container as described above, then drilling a plurality of holes in the flange of the lip, feeding an end of the flexible member up through one hole and down through an adjacent hole, and securing the ends of the flexible member to each other.

The foregoing and other features of the invention and advantages of the present invention will become more apparent in light of the following detailed description of the preferred embodiments, as illustrated in the accompanying figures. As will be realized, the invention is capable of modifications in various respects, all without departing from the invention. Accordingly, the drawings and the description are to be regarded as illustrative in nature, and not as restrictive.

BRIEF DESCRIPTION DRAWINGS

For the purpose of illustrating the invention, there are shown in the drawings embodiments that are presently preferred; it being understood, however, that this invention is not limited to the precise arrangements and constructions particularly shown.

DETAILED DESCRIPTION OF THE PREFERRED EMBODIMENTS

Figure 1:
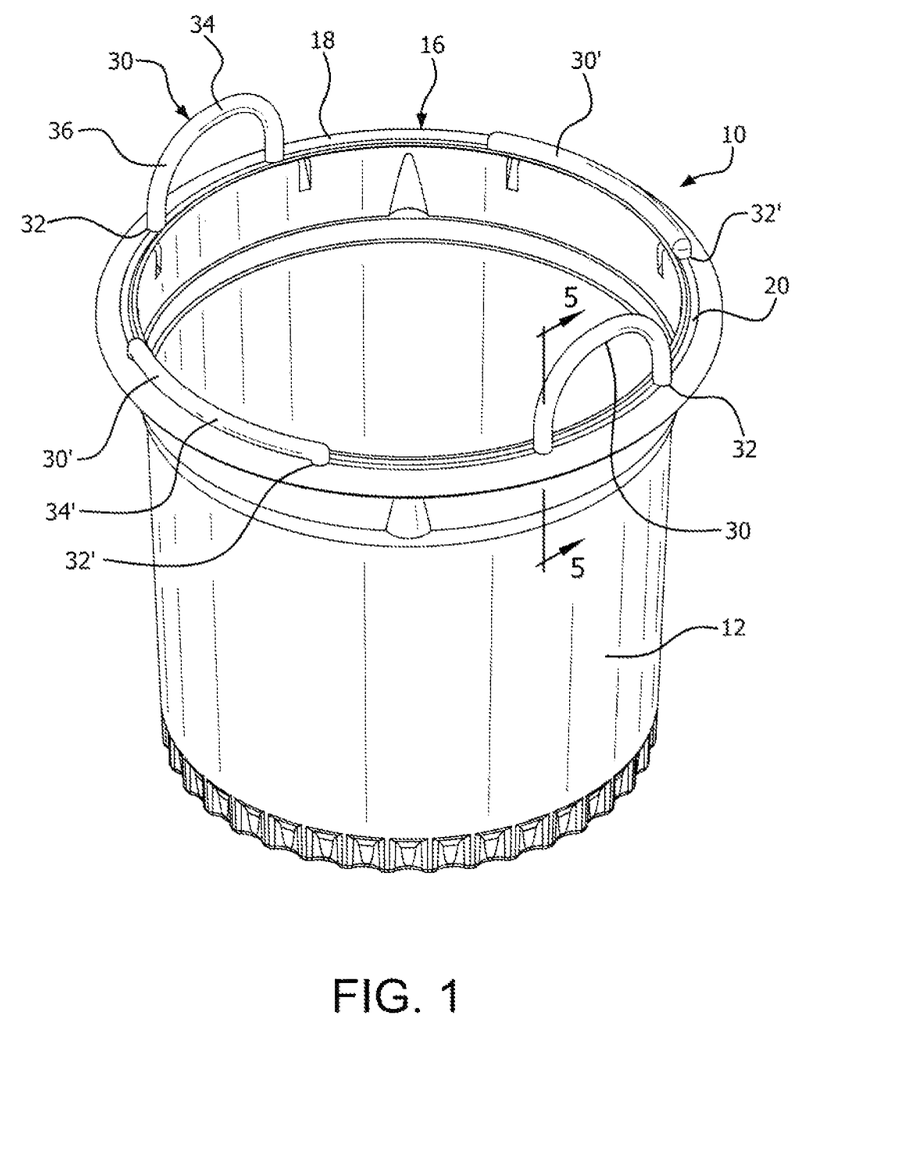
FIG. 1 is a perspective view of an embodiment of a nursery container according to the present invention.
Figure 2:
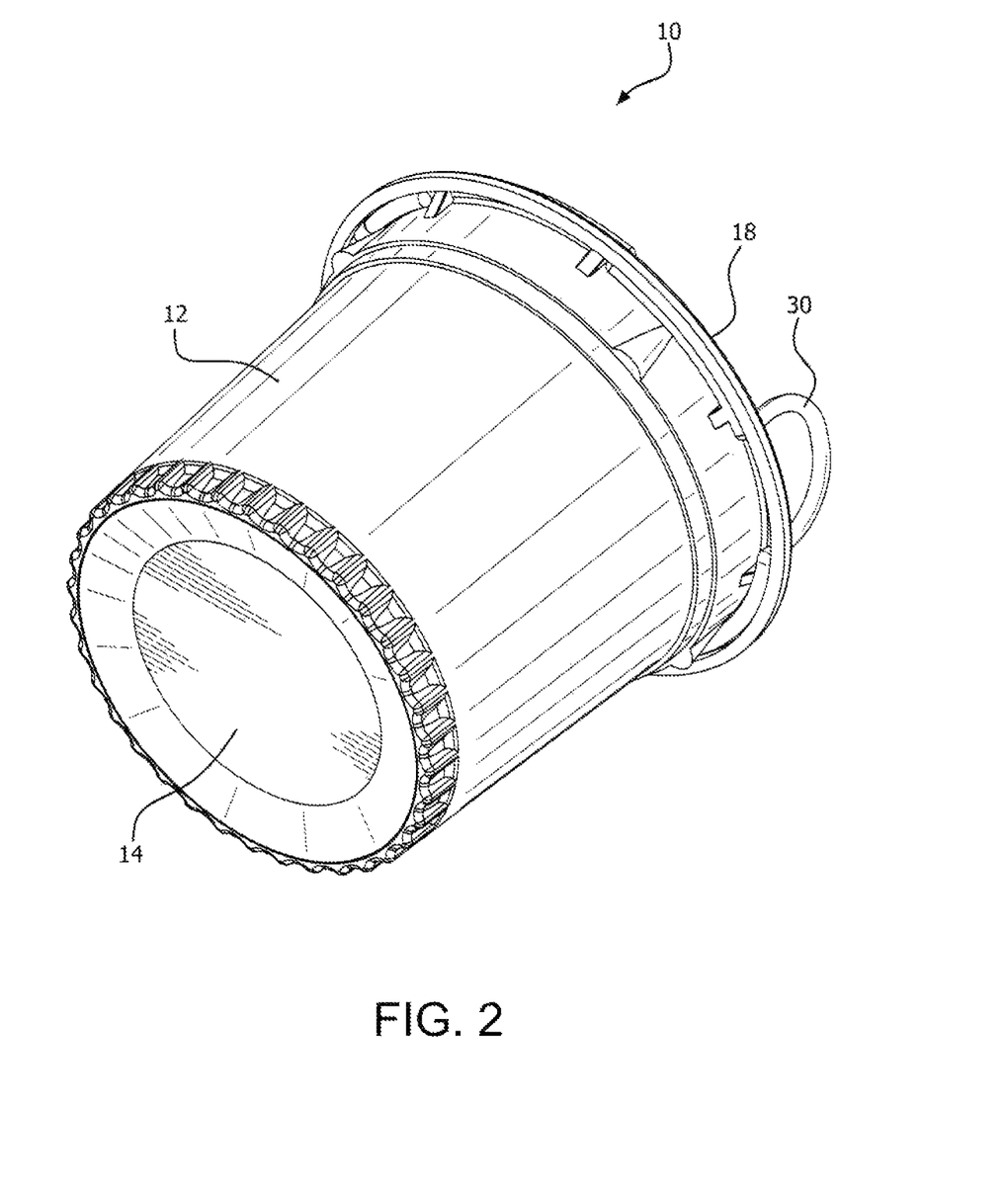
FIG. 2 is a bottom perspective view of the nursery container of FIG. 1.

Referring now to the drawings, wherein like numerals indicate like elements, there is shown in FIG. 1 a nursery container 10 in accordance with the present invention. Container 10 includes a substantially circular side wall 12 that is preferably slightly tapered or frustoconical in shape. The container 10 has a closed bottom end 14 that is formed integral with the side wall 12 and may have a series of ridges or similar stiffening elements molded into it. Drainage holes may be cut or formed in the bottom end 14 to permit draining of water from the container. The side wall 12 ends at an open top end 16.

A lip 18 is formed integrally on the top end and projects radially outward from the outer circumference of the open top end. The lip 18 includes a web or radial flange portion 20 extending outwardly from the periphery of the open top end 16, a recessed portion 22 attached to the flange 20. The recessed portion 22 is radially separated from the side wall by the web portion 20, so as to form a channel 24.

Figure 5:
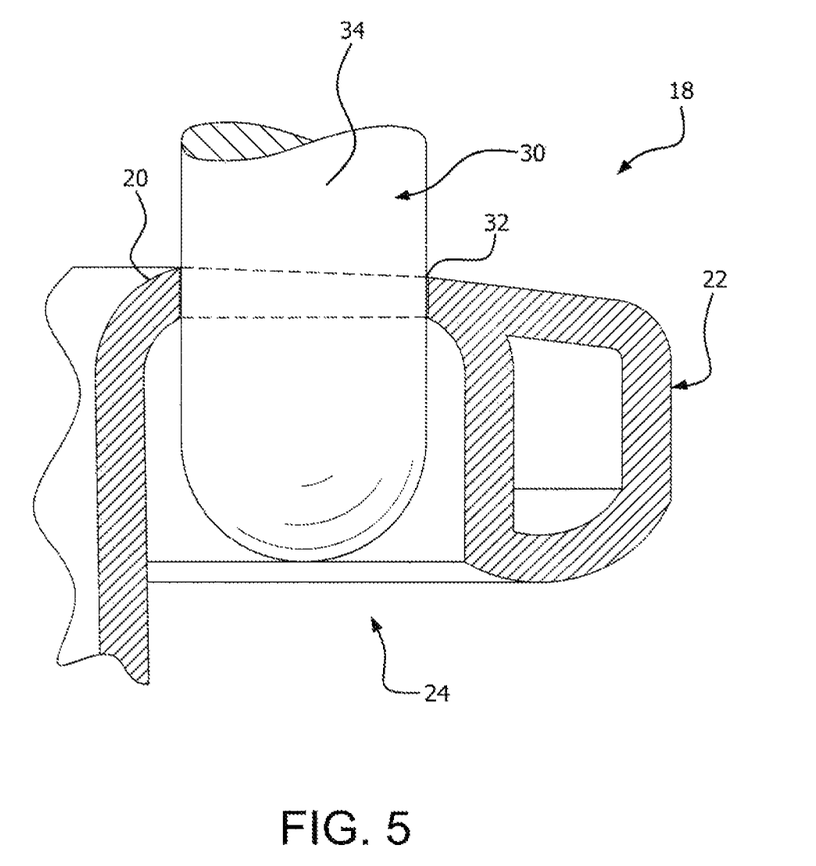
FIG. 5 is a cross-section of the lip taken along lines 5-5 in FIG. 1.

The recessed portion 22 preferably has a generally U-shaped or hollow cross-section with an inner wall, an outer wall, and a curved lower wall. An upper wall is formed over the U-shape by a layer of plastic folded inwardly toward the center of the container 10. The upper wall extends over and is preferably attached to the flange 20 in one or more locations. The folding over of upper wall and flange serves to increase the mechanical strength of the lip 18 and container 10. The details of the lip and one embodiment of a preferred process for forming the container 10 with the lip can be found in U.S. Pat. No. 5,503,886, which is incorporated herein by reference in its entirety.

Figure 3:
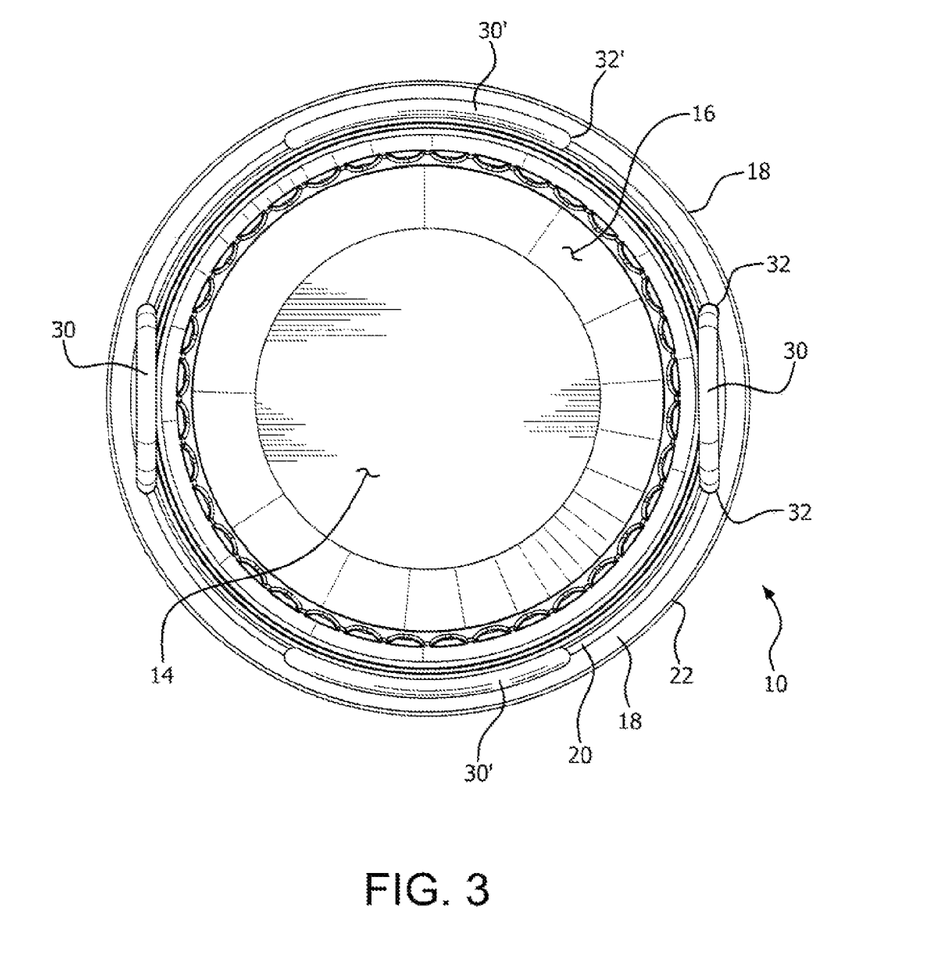
FIG. 3 is a top view of the nursery container of FIG. 1.
Figure 4:
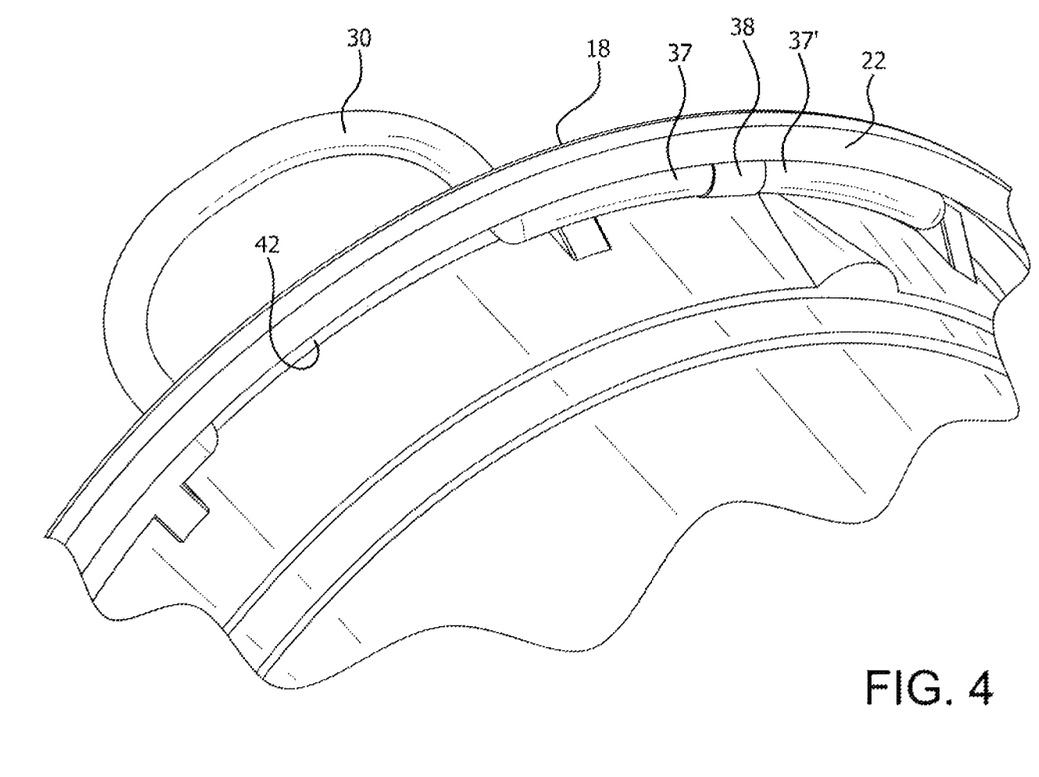
FIG. 4 is an enlarged view of a portion of the rim and a flexible handle of the nursery container in FIG. 1.

In addition to the lip providing a handle, the present invention includes a flexible handle 30 that is attached to the container 10. More specifically, the container 10 includes at least two sets of two holes 32 on opposite sides of the container 10. The holes 32 in each set extend through the flange 20 in the lip 18 and are preferably between about 4" and about 9" inches apart from one another. More specifically, the holes are spaced about 6" inches apart. In the illustrated embodiment there are four sets of holes 32, 32', each in a quadrant of the container circumference. The spacing of the holes 32, 32' on opposite sides of the container are preferably the same, however adjacent holes need not be. For example, in the illustrated embodiments, the holes for handle 30 are spaced closer than the holes for handle 30'. The wider spaced holes prevent the material used for the lifting handles to droop down the side of the container and interfere with the stacking of the containers. It is important that the holes 32, 32' do not significantly alter the integrity of the hollow recessed portion 22 since doing so will reduce the stiffness of the lip. It is also beneficial that the holes 32, 32' do not cut into the side wall 12 of the container at the location of the lip. Thus, forming the holes 32, 32' in the flange 20 maintains the continuity of the lip in the vicinity of the holes. The holes 32, 32' permit a passage from the top of the container into the channel 24 formed between the recessed portion 22 and the side wall 12. The holes 32, 32' can be formed in any suitable manner, such as drilling, punching, or formed during manufacture. The holes need not be circular, but could be slots, depending on the shape of the handles used. The number of sets or pairs of holes can be varied depending on the size of the container and the thickness of the handle.

Figure 6:
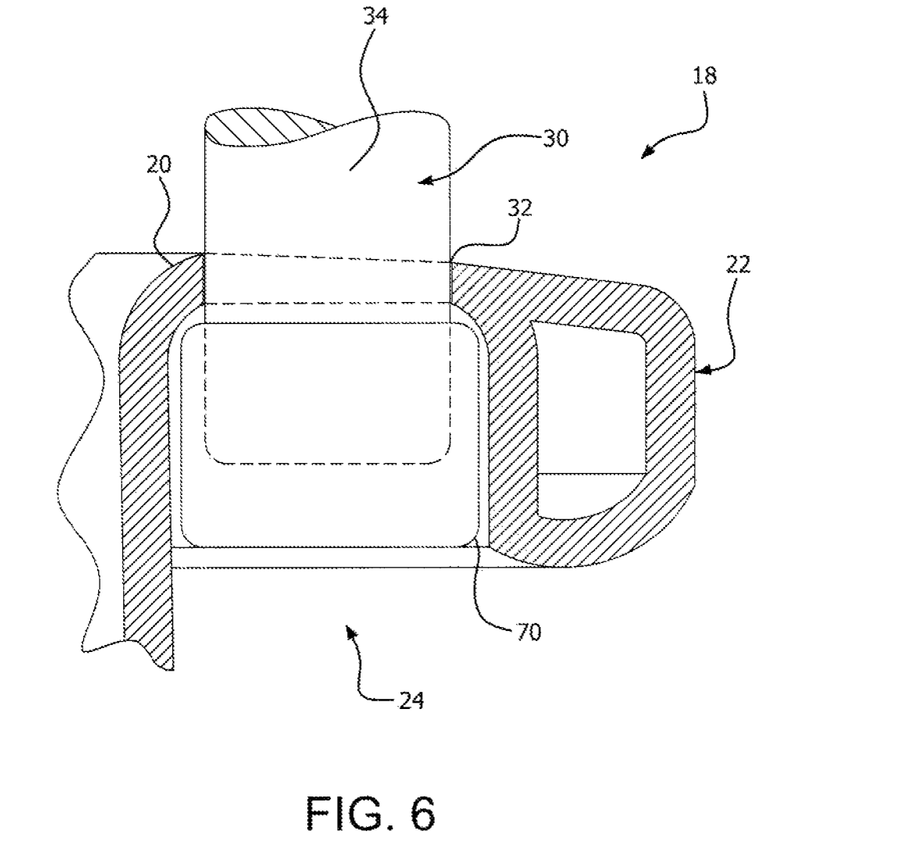
FIG. 6 is a cross-section of the lip showing an alternate mechanism for securing the handles to the container using stops.

Each handle 30 includes a flexible portion 34 that is attached to the container 10. The drawings illustrate one preferred embodiment in which the flexible portion 34 extends through the holes in 32, 32 in a serpentine fashion and preferably has its opposed ends attached to one another so as to form a continuous loop around the container as shown. To form the handle 30, a length of the flexible member 34 is selected with a dimension that is longer than the circumference of the channel 24 of the container. The length of rope will depend on the size of the container and the number of holes. As should be apparent the length of the flexible member should be long enough to result in at least two portions of the member 34 forming handle loops 36 that extend above the lip 18. A free end of the flexible member 34 is fed down through a hole 30 and up through an adjacent hole 30' then repeated through each of the holes 30, 30' so as to form the serpentine shape. The free end 37 is then preferably secured to the opposite end 37', such as with a clamp 38. However, it is also contemplated that the free ends could be secured to the container or have stops 70 attached to the ends that are larger than the holes so as to prevent the flexible member from feeding backwards and out of the hole (FIG. 6). Preferably the ends are secured to one another with a compression clamp 38, or are melted, or welded (such as ultrasonically) to one another.

It is contemplated that the flexible member 34 does not need to extend completely around the container. Instead two or more shorted lengths of flexible member 34 can be used with each length defining a handle 36. The ends would be secured in a manner that would prevent them from backing out of the hole.

The flexible member 34 can be a rope or strap made from nylon, Kevlar, rubber or braided twine, or any other suitable flexible material that is capable of withstanding the anticipate loads.

By including the holes 32' that has a portion 34' of the flexible member 34 extending between them so as to form a secondary handle 30' in the quadrant of the circumference of the lip adjacent to the handles 30, it allows the entire rim to function in the support of the loading imposed by the flexible handle. More specifically, the loading imposed by the lifting of the handles 30, produces an upwardly directed bearing load on the bottom the lip 18 on the portions between holes 30 and 30'. At the same time, the load results in downwardly directed bearing force on the lip 18 between holes 30'.

Additionally, the handles 30' with the longer flexible member 34" are useful for larger or heavier containers where an individual is grabbing a handle with both their hands. The flexible handle is an ergonomic improvement over the cast integral handles in the blow mold container which can potentially reduce worker injury.

A critical feature to the success of the flexible handle nursery container according to the present invention is the combination of the flexible handle and a heavily reinforced lip. Due to the manufacturing method of conventional blow molded products, the nominal side wall and lip area is insufficient in strength to retain a flexible handle when placed under load. The lip or side wall that is penetrated with the hole to allow the feeding of the flexible handle would be severely damaged and collapse due to the forces imparted by the flexible handle or its retention device (clamp) when used to lift the container when filled with a soil mix and plant material. This damage would eventually cause catastrophic failure with the flexible handle becoming dislodged from the container. The present invention overcomes these issues by using a strengthened rim that includes the recess portion which not only forms a channel for retraining the flexible handle, but also provides increased stiffness and rigidity around the rim to accommodate the loading The present invention may be embodied in other specific forms without departing from the spirit or essential attributes thereof and, accordingly, reference should be made to the appended claims, rather than to the foregoing specification, as indicating the scope of the invention.

The invention claimed is:

1. A blow molded nursery container comprising:
a substantially circular side wall;
a closed bottom end;
an open top end;
a projecting lip positioned on the outer circumference of the open top end, the lip including a radial flange portion extending outwardly from the periphery of the open top end, a recessed portion attached to the flange and having a substantially hollow cross-section formed during blow-molding of the container and defined by an inner wall, an outer wall spaced apart from the inner wall, and a lower wall attaching the inner wall to the outer wall so as to define a hollow area between the inner and outer walls, and an upper wall attached to the outer wall and extending over the hollow area and at least a portion of the flange, the recessed portion being radially separated from the side wall by the flange so as to form a channel;
at least two handles connected to the container, each handle including a flexible member with a portion that is located above and spaced apart from the lip, the spacing permitting access by a user's fingers, the flexible member extending through at least two holes in the flange of the lip between the sidewall and the recessed portion, and wherein a portion of the flexible member extends in the channel between the holes and is restrained on an opposite side of the side wall or flange from the portion above the lip so as to connect the handle to the container.

2. The blow-molded container of claim 1, wherein the flexible members of the handles are connected to one another such that the flexible members form a loop around the circumference of the container, the connection of the flexible members to one another forming the connection of the handles to the container.

3. The blow-molded container of claim 2, wherein the flexible members are integrally connected to one another on one side of the container and clamped to one another on the other side of the container.

4. The blow-molded container of claim 2, wherein the flexible members are integrally connected to one another on one side of the container and welded to one another on the other side of the container.

5. The blow-molded container of claim 1, wherein the flexible members are connected to the container with stops that are larger than the holes so as to prevent the flexible member from feeding backwards and out of the hole.

6. The blow-molded container of claim 1, wherein the flexible members of the handles are connected to one another such that the flexible members form a loop around the circumference of the container, the connection of the flexible members to one another forming the connection of the handles to the container for securing the handles to the container.

7. The blow-molded container of claim 6, wherein there are eight holes and wherein the loop of flexible members extends through the holes in a serpentine manner such that between the handles portions of the flexible members are in the channel and at least a portion is located above the flange.

8. A blow-molded nursery container, comprising:
a substantially circular side wall;
a closed bottom end;
an open top end;
a projecting lip positioned on the outer circumference of the open top end, the lip including a radial flange portion extending outwardly from the periphery of the open top end, a recessed portion attached to the flange and having a substantially hollow cross-section formed during blow-molding of the container and defined by an inner wall, an outer wall spaced apart from the inner wall, and a lower wall attaching the inner wall to the outer wall so as to define a hollow area between the inner and outer walls, and an upper wall attached to the outer wall and extending over the hollow area and at least a portion of the flange, the recessed portion being radially separated from the side wall by the flange so as to form a channel; and
at least two handles connected to the container, each handle including a flexible member with a portion that is located above and spaced apart from the lip, the spacing permitting access by a user's fingers, the flexible member extending through at least two holes in the side wall or flange and restrained on an opposite side of the side wall or flange from the portion above the lip so as to connect the handle to the container;
wherein there are a plurality of holes formed between the handles, the holes formed in the flange of the lip between the sidewall and the recessed portion, wherein the flexible members of the handles are fed downward through a hole and upward through an adjacent hole in a serpentine manner and connected to one another such that the flexible members form a loop around the circumference of the container, the connection of the flexible members to one another forming the connection of the handles to the container for securing the handles to the container, and wherein portions of the flexible member are located in the channel underneath the flange between two adjacent holes and portions are located above the flange between adjacent holes.

9. The blow-molded container of claim 8, wherein the flexible members are integrally connected to one another on one side of the container and clamped to one another on the other side of the container.

10. The blow-molded container of claim 9 wherein the flexible member is a rope or strap made from nylon, Kevlar, rubber or braided twine.

11. A blow molded nursery container comprising:
a substantially circular side wall;
a closed bottom end;
an open top end;
a projecting lip positioned on the outer circumference of the open top end, the lip including a radial flange portion extending outwardly from the periphery of the open top end, a recessed portion attached to the flange and having a substantially hollow cross-section formed during blow-molding of the container and defined by an inner wall, an outer wall spaced apart from the inner wall, and a lower wall attaching the inner wall to the outer wall so as to define a hollow area between the inner and outer walls, and an upper wall attached to the outer wall and extending over the hollow area and at least a portion of the flange, the recessed portion being radially separated from the side wall by the flange so as to form a channel, and the flange of the lip including at least eight holes;

a flexible member extending around the container and having two ends, the flexible member defining at least two handles, the flexible member extends upward through one hole and downward through an adjacent hole such that portions of the flexible member are located above the flange and portions are located below the flange, at least two of the portions above the flange defining the handles, and the portions below the flange extending within the channel, and wherein the ends of the flexible member are secured to one another to form a loop around the container;

wherein the flexible member extends through the holes in a serpentine manner, and wherein portions of the flexible member between handles are located in the channel underneath the flange and portions are located above the flange.

12. The blow-molded container of claim 11, wherein the ends of the flexible member are secured to one another through welding, melting or a mechanical connection.

13. The blow-molded container of claim 11 wherein the flexible member is a rope or strap made from nylon, Kevlar, rubber or braided twine.

14. A method of forming a blow molded nursery container according to claim 11, comprising the steps of
blow molding a parison to form the nursery container;
drilling a plurality of holes in the flange of the lip;
feeding an end of the flexible member up through one hole and down through an adjacent hole; and
securing the ends of the flexible member to each other.

15. A blow molded nursery container comprising:
a substantially circular side wall;
a closed bottom end;
an open top end;
a projecting lip positioned on the outer circumference of the open top end, the lip including a radial flange portion extending outwardly from the periphery of the open top end, a recessed portion attached to the flange and having a substantially hollow cross-section formed during blow-molding of the container and defined by an inner wall, an outer wall spaced apart from the inner wall, and a lower wall attaching the inner wall to the outer wall so as to define a hollow area between the inner and outer walls, and an upper wall attached to the outer wall and extending over the hollow area and at least a portion of the flange, the recessed portion being radially separated from the side wall by the flange so as to form a channel;

a first flexible member engaged with the container and including a portion extending above the lip, the first flexible member extending through first and second holes formed in the flange of the lip between the side wall and the recessed portion;

a second flexible member engaged with the container on an opposite side from the first flexible member, the second flexible member including a portion extending above the lip, the second flexible member extending through third and fourth holes formed in the flange of the lip between the side wall and the recessed portion; and wherein the first and second flexible members are connected to one another such that the flexible members form a loop around the circumference of the container, the connection of the flexible members to one another forming the connection of the flexible members to the container, and wherein a portion of each flexible member is located in and extends along the channel underneath the flange between two adjacent holes.

16. The blow-molded container of claim 15, wherein the flexible members are integrally connected to one another on one side of the container and clamped to one another on the other side of the container.

17. The blow-molded container of claim 15, wherein the flexible members are connected to the container with stops that are larger than the holes so as to prevent the flexible member from feeding backwards and out of the hole.

\* \* \* \* \*